United States Patent
Rinholm et al.

(10) Patent No.: US 6,946,762 B2
(45) Date of Patent: Sep. 20, 2005

(54) ELECTRIC MOTOR DRIVE FOR A REEL MOWER

(75) Inventors: Brent Gordon Rinholm, Fuquay Varina, NC (US); Randall John Griffin, Erwin, NC (US)

(73) Assignee: Deere & Co., Moline, IL (US)

( * ) Notice: Subject to any disclaimer, the term of this patent is extended or adjusted under 35 U.S.C. 154(b) by 0 days.

(21) Appl. No.: 10/651,016

(22) Filed: Aug. 26, 2003

(65) Prior Publication Data

US 2005/0044838 A1 Mar. 3, 2005

(51) Int. Cl.$^7$ .................................................. H02K 7/00
(52) U.S. Cl. .......................................... 310/66; 310/89
(58) Field of Search .............................. 310/64, 66, 89; 56/7, 249

(56) References Cited

U.S. PATENT DOCUMENTS

| | | |
|---|---|---|
| 2,057,417 A | 10/1936 | Clapper |
| 2,734,328 A | 3/1956 | Wood |
| 2,881,887 A | 4/1959 | Faas |
| 2,923,117 A | 5/1960 | Handerson |
| 3,267,594 A | 8/1966 | Mattson et al. |
| 3,732,673 A | 5/1973 | Winn, Jr. |
| 4,021,996 A | 5/1977 | Bartlett et al. |
| 4,306,402 A | 12/1981 | Whimp |
| 4,546,601 A | 10/1985 | Skovhoj |
| 4,680,922 A | 7/1987 | Arnold |
| 4,685,280 A | 8/1987 | Lloyd et al. |
| 4,995,227 A | 2/1991 | Foster |
| 5,261,213 A | 11/1993 | Humphrey |
| 5,265,404 A | 11/1993 | Aldred et al. |
| 5,293,729 A | 3/1994 | Curry et al. |
| 5,406,778 A | 4/1995 | Lamb et al. |
| 5,896,734 A | 4/1999 | Chesack et al. |
| 5,934,051 A | 8/1999 | Hahn |
| 5,934,053 A | 8/1999 | Fillman et al. |
| 6,082,082 A | 7/2000 | Hunter et al. |
| 6,082,084 A | 7/2000 | Reimers et al. |
| 6,253,534 B1 | 7/2001 | Hunter et al. |
| 6,430,902 B1 | 8/2002 | Saiia |
| 2002/0095922 A1 | 7/2002 | Goman et al. |
| 2003/0067228 A1 | 4/2003 | Vanjani |
| 2003/0111924 A1 * | 6/2003 | Ma et al. ..................... 310/168 |

FOREIGN PATENT DOCUMENTS

GB          907245          10/1962

OTHER PUBLICATIONS

Toro, Reelmaster® 450–D manual, 1991, 4 pages.

* cited by examiner

Primary Examiner—Thanh Lam
(74) Attorney, Agent, or Firm—The Law Office of Randall T. Erickson, P.C.

(57) ABSTRACT

The invention provides an electric motor drive for a reel mower. The drive includes an electric motor, a casing, an endless traction member and a secondary output shaft. Preferably the electric motor is a brush-less permanent magnet type electric motor. The electric motor includes a rotor, a stator, and a motor housing that carries the rotor and stator, the rotor having a rotor output shaft extending from the housing. The casing is mounted to the motor housing. The endless traction member is engaged to the rotor output shaft to be circulated by rotation of the rotor output shaft. The secondary output shaft is engaged by the endless traction member to be rotated by circulation of the endless traction member. The secondary output shaft extends from inside the casing to outside the casing to be operatively connected to the reel to rotate the reel. The secondary output shaft is mounted at about the same elevation as the axis of rotation of the reel and the rotor output shaft is mounted above the axis of rotation of the reel.

26 Claims, 5 Drawing Sheets

ELECTRIC MOTOR DRIVE FOR A REEL MOWER

TECHNICAL FIELD OF THE INVENTION

The invention relates to electric motor drives for reel mowers. Particularly, the invention relates to an electric motor assembly and mounting arrangement on a reel mower.

BACKGROUND OF THE INVENTION

Conventional reel mowers have been known that utilize hydraulically driven motors, brush-less permanent magnet motors or commutated electric motors to drive the reel. Hydraulically driven motors and brush-less permanent magnet motors have been known wherein the motors directly drive the reel. Commutated electric motors have been known which are located above the reel, centrally located, and which drive the reel with a belt.

The present inventors have recognized that it would be desirable to provide a brush-less permanent magnet motor drive for a reel mower which drove the reel mower via a belt. The present inventors have recognized that it would be desirable to provide a brush-less permanent magnet drive for a reel mower wherein the brush-less permanent magnet drive was elevated from the centerline of the reel to be located further from the ground to protect the motor.

In conventional permanent magnet motors, a plurality of permanent magnets are inserted and arranged in a rotor so that magnetic poles are formed. The rotor is driven by electrified stator-side coils that are disposed substantially around the rotor and thereby form rotating magnetic fields. Due to the permanent magnets, magnetic fields are formed individually for the predetermined poles, so that the motor size can be reduced and the motor output can be increased.

The problem of loss and heat generation due to eddy currents in the magnets is significant. Heat generation in a motor leads to demagnetization of the magnet, and can result in a failure of the motor.

The present inventors have recognized that it would be desirable to provide a brush-less permanent magnet drive for a reel mower wherein the brush-less permanent magnet electric motor drive maintained sufficient heat dissipation to achieve the required driving power.

The present inventors have recognized that it would be desirable to provide an electric motor drive for a reel mower wherein the drive is quickly and easily installed during assembly of the reel mower and is quickly and easily removable and replaceable for maintenance and repair.

The present inventors have recognized that it would be desirable to provide an electric motor drive for a reel motor that was mounted on an end of the reel and wherein the motor vs. reel turn ratio could be selected or modified.

SUMMARY OF THE INVENTION

The invention provides an electric motor drive for a reel mower. The drive includes an electric motor, a casing, an endless traction member, such as a belt, and a secondary output shaft. The electric motor includes a rotor, a stator, and a motor housing that carries the rotor and stator, the rotor having a rotor output shaft extending from the housing. The casing is mounted to the motor housing.

The endless traction member is engaged to the rotor output shaft to be circulated by rotation of the rotor output shaft. The secondary output shaft is engaged by the endless traction member to be rotated by circulation of the endless traction member. The secondary output shaft extends from inside the casing to outside the casing to be operatively connected to the reel to rotate the reel.

Preferably the electric motor is a brush-less permanent magnet type electric motor.

The motor is preferably mounted to an end of the reel with a centerline of the rotor elevated from an axis of rotation of the reel.

According to another aspect of the invention, the motor housing and the casing both include heat-dissipating fins. The motor housing comprises radially and axially extending, heat-dissipating plate fins and the casing comprises horizontal, axially extending heat-dissipating plate fins.

According to another aspect of the invention the casing comprises laterally extending flanges, the flanges sized and arranged to receive a fastener on each side of the secondary output shaft to fasten the casing to an external frame.

According to another aspect of the invention, the casing comprises a front cover and a rear cover, the front cover comprises heat fins and the rear cover can carry a bearing for journaling the secondary output shaft, the front and rear covers fastened to each other and to the motor housing. The front cover can carry a front bearing for journaling the secondary output shaft.

According to another aspect of the invention, the casing is mounted to the frame by at least one threaded member engaged into a slot, wherein loosening of the threaded member permits withdrawal of the threaded member from the slot in a direction substantially perpendicular to an axial direction of the threaded member.

Particularly, the casing can be mounted to the frame by two threaded studs. Each stud is engaged by threading or by a head or nut at one end to the casing and at an opposite end by a head or nut to the frame. The frame includes two open slots corresponding in position to the studs, wherein the studs can be positioned into the slots by a positioning of the studs adjacent the corresponding slots and then a turning of the casing about an axis of the reel to slide the studs into the slots. Thereafter the heads or the nuts at either end of the studs can be tightened against the frame on a side of the frame opposite the casing to secure the casing to the frame.

The invention provides an electric motor drive that maintains sufficient heat dissipation and power output to drive a typical reel mower. The invention provides an end-mounted electric motor assembly that avoids damage by being elevated from the ground. The present invention provides a motor assembly that is quickly and easily removable for maintenance and repair.

The present invention provides an end-mounted motor assembly that drives the reel axle via a pair of sprockets or pulleys wherein the relative diameters of the sprockets or pulleys can be selected to change the reel speed or torque for a given motor.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
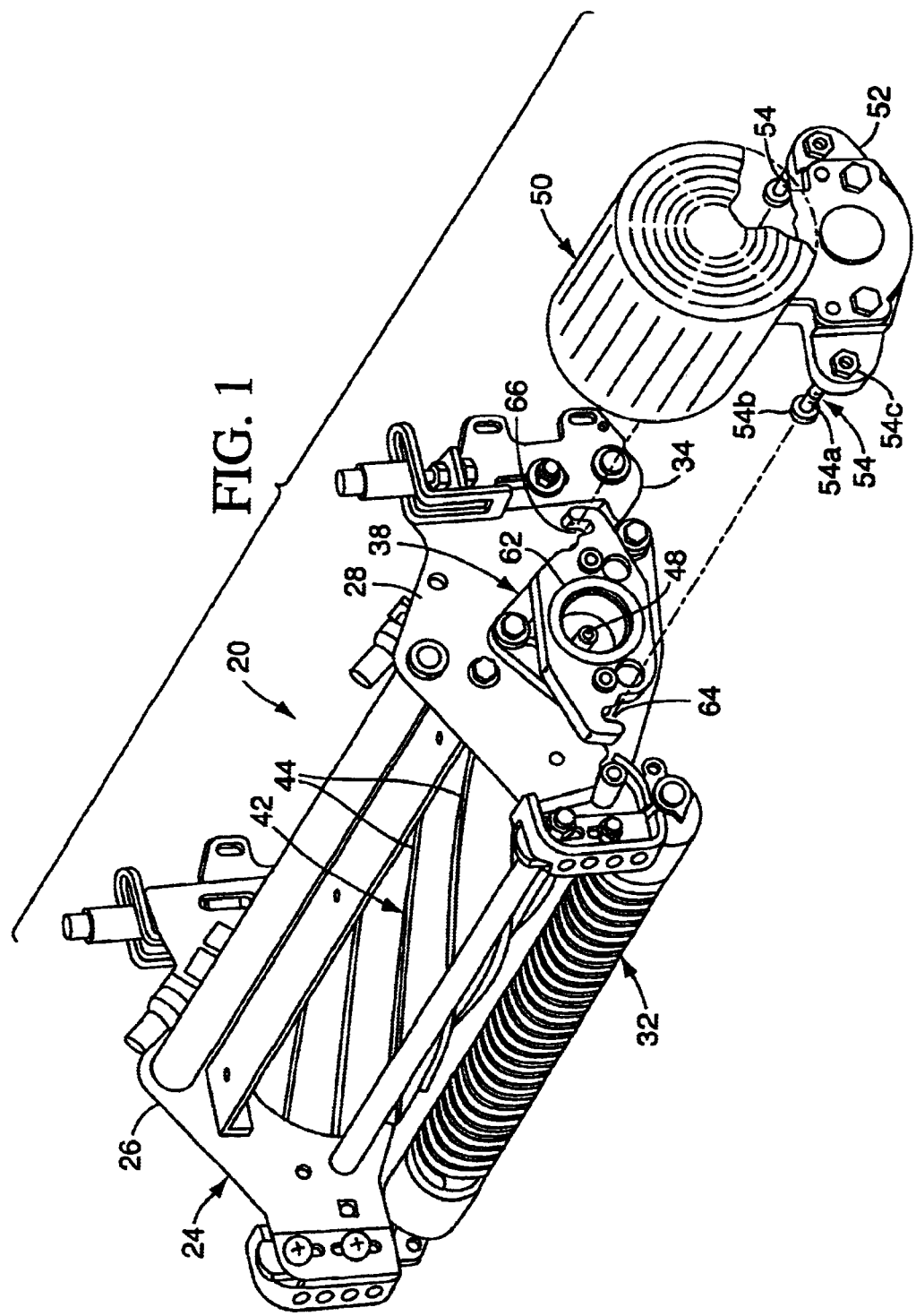
FIG. 1 is a partially fragmentary, exploded perspective view of the reel unit of the present invention.
Figure 2:
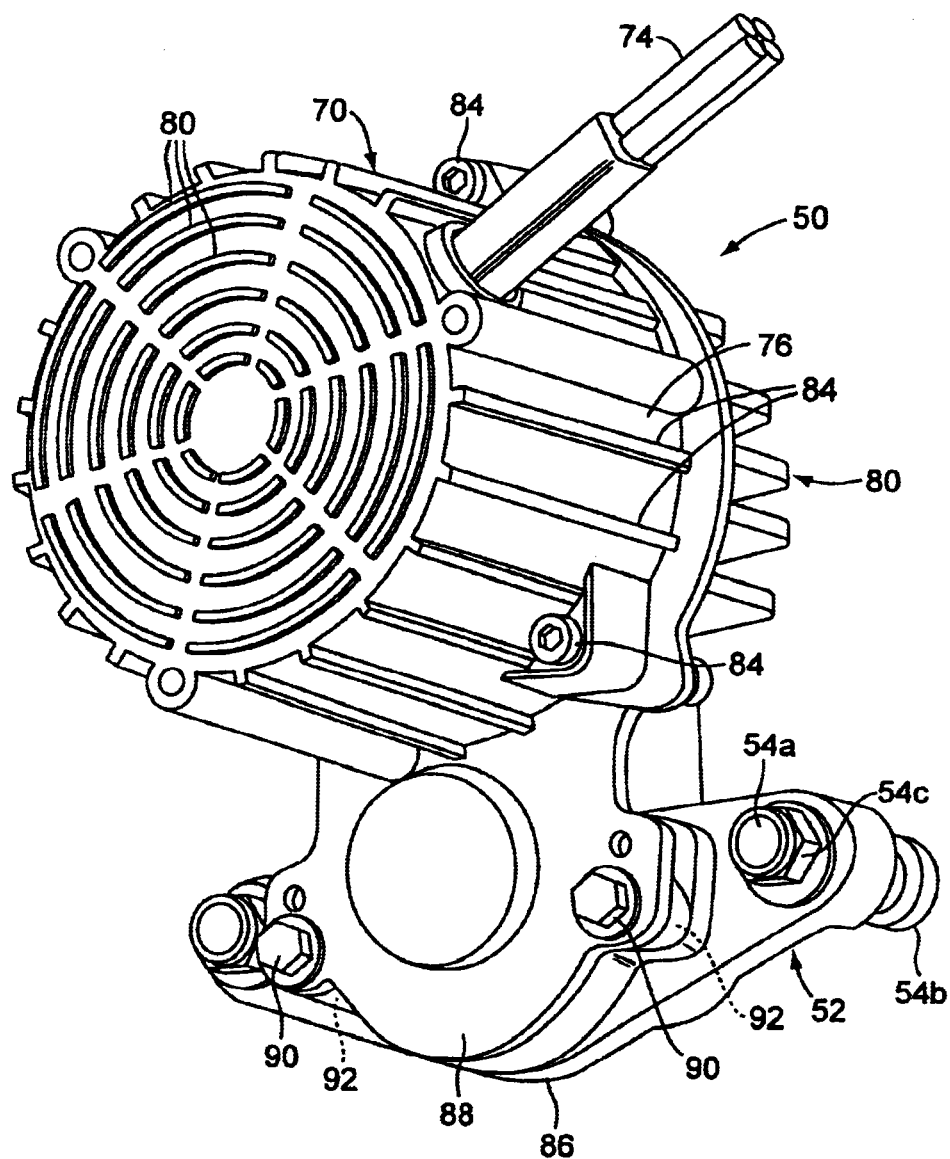
FIG. 2 is a rear perspective view of the motor assembly taken from FIG. 1.
Figure 3:
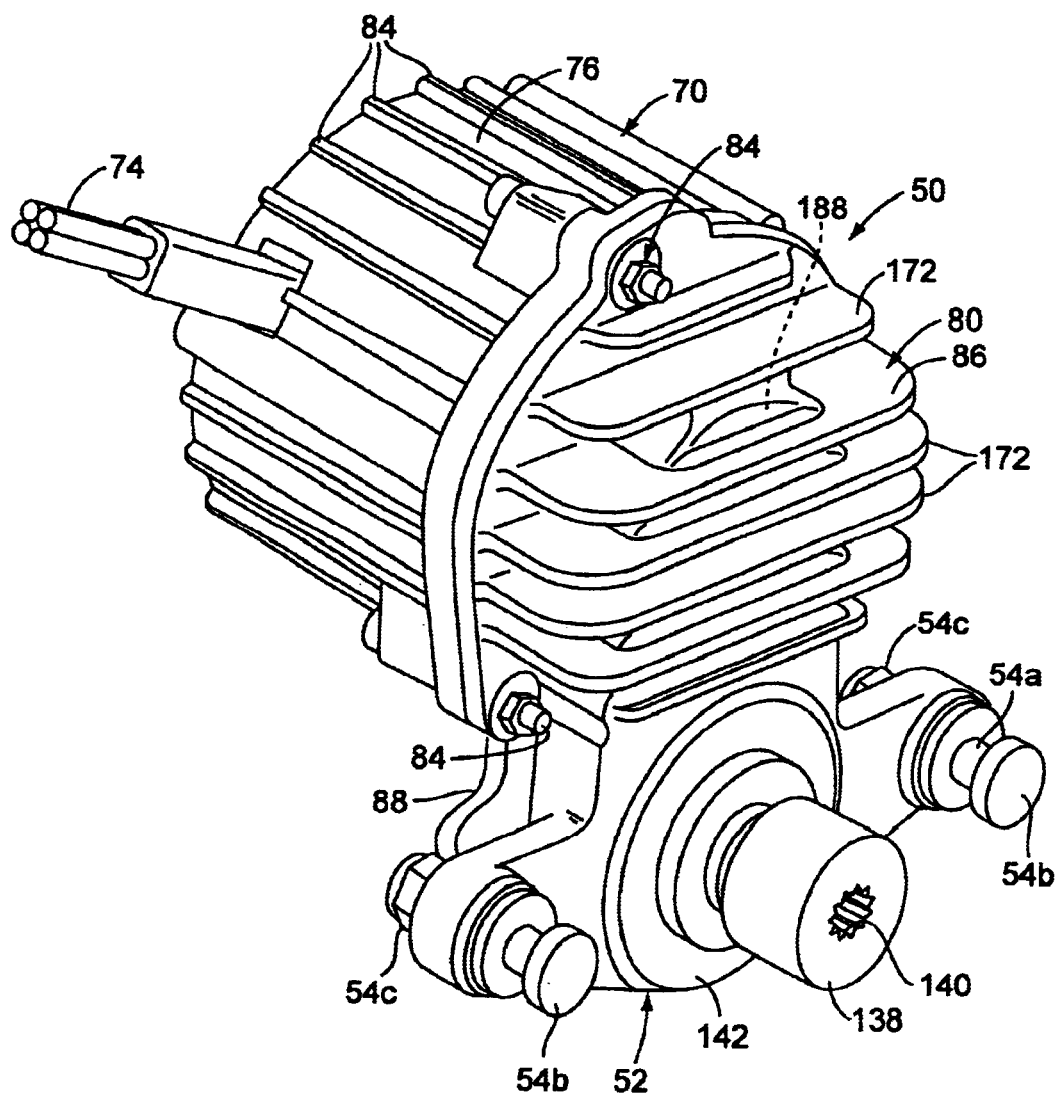
FIG. 3 is a front perspective view of the motor assembly taken from FIG. 1.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a reel unit 20 of the present invention that is intended to be pulled or pushed by a tractor or other vehicle. Typical known vehicles and cutting reel units are disclosed for example in U.S. Pat. Nos. 5,343,680; 5,412,931 and 5,459,984.

The reel unit 20 illustrated includes a support frame 24 that includes sideplate 26, 28. The sideplate 26, 28 are supported by front and rear rollers 32, 34 respectively. The sideplates 26, 28 each carry a reel housing 38 (one shown). A reel 42 (shown schematically) having blades 44, is rotatably carried by the two housings 38. The reel 42, when rotated, can cut grass between the blades 44 and a bedknife (not shown) as is known. The housing 38 include bearings (not shown) that journal ends of a center shaft 48 of the reel 42. A motor assembly 50 is mounted to one of the housing 38. The assembly 50 includes a mounting flange 52 that carries two studs 54. The studs 54 each have a threaded shaft 54a, a head 54b, and a nut 54c. The shaft 54a passes loosely through a hole in the flange 52.

The housing 38 includes an annular mating surface 62 and two spaced-apart slots 64, 66. One of the slots 64 is open in a downward direction and the other slot 66 is open in an upward direction.

To install the motor assembly 50 to the housing 38, the assembly 50 is placed onto the mating surface 62 with one stud shaft 54a located near to but below the slot 64 and the other stud shaft 54a is located near to but above the slot 66. The assembly 50 is then rotated about a horizontal axis to seat the stud shafts 54a into the respective slots 64, 66, and then the nuts 54c are tightened to clamp the housing 38 and the flange 52 together.

According to this aspect of the invention, the assembly 50 can be removed and reinstalled without ever having to separate the nuts 54c from their respective shafts 54a. The disassembly and re-assembly is more quickly accomplished without the need to completely unscrew the nuts 54c and withdraw the studs 54. Although the preferred embodiment illustrates studs 54 with heads 54b and nuts 54c, it is encompassed by the invention that the heads 54b can be replaced by nuts or that the nuts 54c can be replaced by tapped holes in the flange 52.

FIGS. 2–5 illustrate the motor assembly 50 in more detail. The assembly 50 includes a brush-less, permanent magnet motor 70 driven by a supply of electric power conducted through wires 74. The wires 74 penetrate a motor housing 76. The motor housing 76 includes a circumferentially arranged, longitudinally extending, heat-dissipating fins 80 on a rear face thereof, and longitudinally extending, radially extending, heat-dissipating fins 80 on the circumference thereof.

According to the preferred embodiment of the invention, for a 22" long, 5" diameter reel, a motor having a power rating of 1 KW is used. The motor is rated at 860 watts continuous and 1200 watts at 50% duty cycle at 30 amps input. The motor is preferably of the type described in U.S. Ser. No. 10/651015, filed on the same day as the present application, and identified by attorney docket No. 6270P0350US. The motor is powered by an alternator driven into rotation by the mowing vehicle engine, such as described in U.S. Pat. No. 6,531,850. This motor and reel configuration is advantageous for cutting short grass areas, such as golf course putting greens.

Other permanent magnet motors are disclosed for example in U.S. Pat. Nos. 4,242,610; 5,758,709; 6,555,941; 6,353,275 and 6,087,752, herein incorporated by reference.

The motor 70 is fastened to a casing 80 by fasteners 84, which can be cap screws and nuts. The casing 80 includes a front cover 86 and a rear cover 88. The flange 52 can be a unitary portion of the front cover 86. The front cover 86 is fastened to the rear cover 88 by the fasteners 84, which clamp the motor housing 76, the rear cover 88 and the front cover 86 together, and by screws 90, threaded into threaded holes 92 of the front cover 86.

Figure 5:
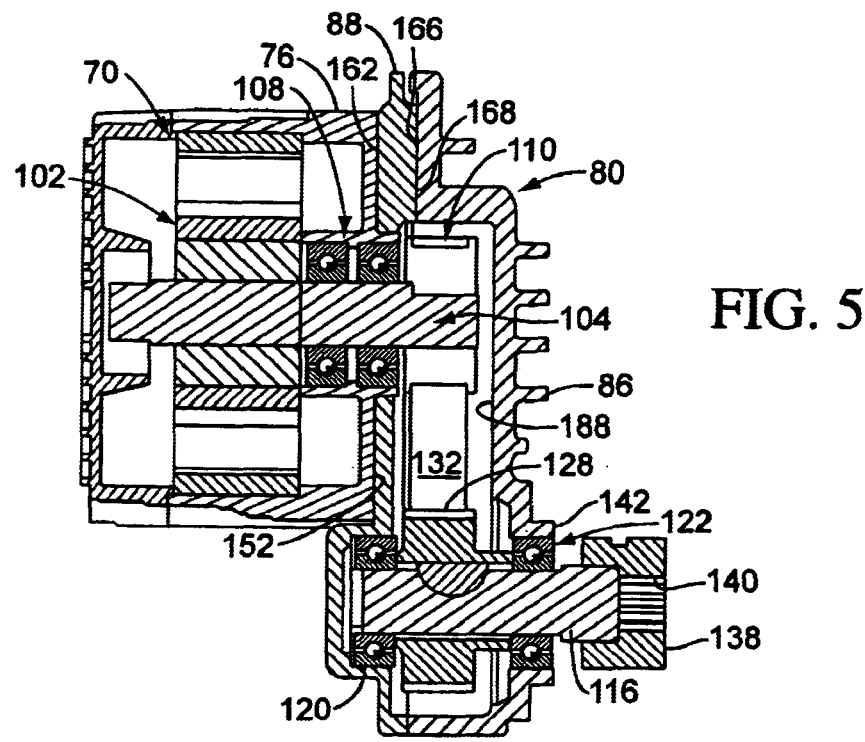
FIG. 5 is a vertical sectional view of the assembly of FIG. 2.

As illustrated in FIG. 5, the motor includes a rotor 102 that drives a motor output shaft 104. The output shaft 104 passes through a bearing assembly 108 held in place by the motor housing 76. The shaft 104 is keyed to a first toothed pulley 110 within the casing 80. A secondary output shaft 116 is located below the pulley 110. The shaft 116 is journaled by a rear bearing 120 carried in a concave portion 118 of the rear cover 88, and a front bearing 122 carried by the front cover 86. The shaft 116 is keyed to a second toothed pulley 128. A toothed belt 132 wraps around the pulleys 110,128.

The shaft 116 extends forwardly through a hole in the front cover 86 to a free end thereof, where it is engaged to a shaft coupling 138. The shaft coupling 138 includes a splined hole 140 which receives a splined end of the reel shaft 48 when the assembly 50 is installed onto the housing 38. The front cover 86 also includes an annular mating surface 142 that presses against the annular surface 62 of the housing 38 when the assembly 50 is completely installed.

The pulleys 110,128 are relatively sized so as to rotate the reel 42 at the desired speed and torque given the output of the motor 70. According to the preferred embodiment of the invention, a turn ratio between the motor output shaft and the secondary output shaft is 1.28 to 1.

Figure 4:
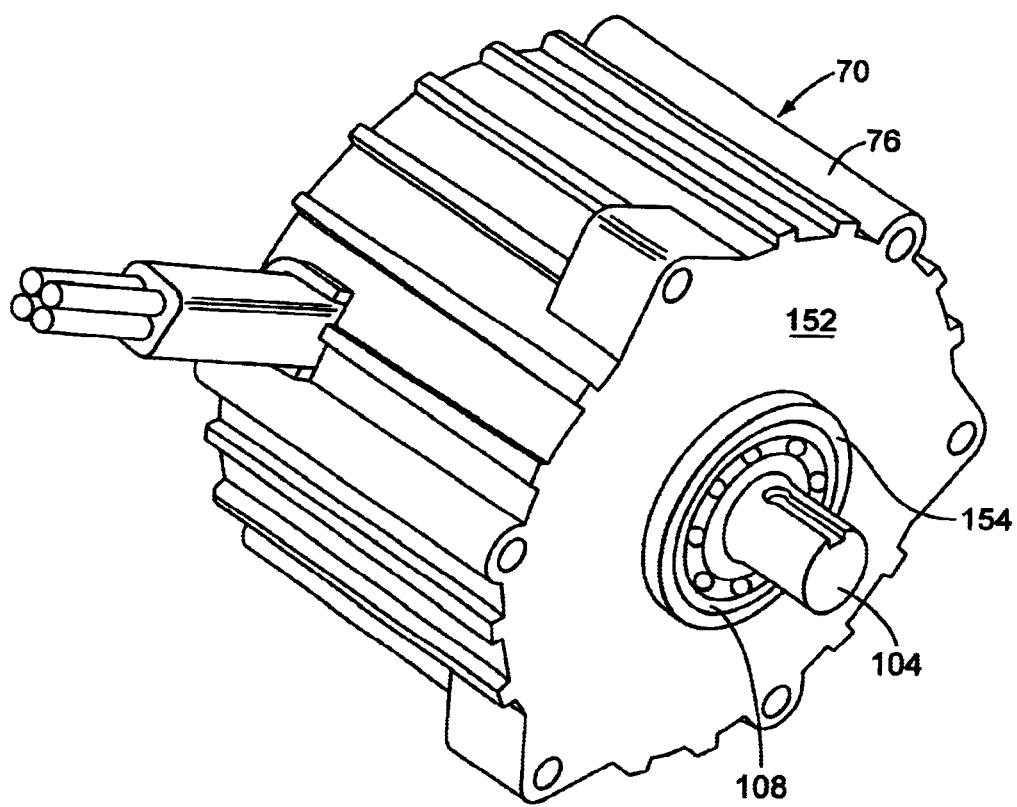
FIG. 4 is a front perspective view of a motor taken from the motor assembly of FIG. 3.

FIG. 4 illustrates the motor 70 separated from the casing 80. The motor housing 76 includes a front surface 152 with a raised journal 154 for holding the bearing assembly 108. The rear cover 88 has a correspondingly shaped, coextensive rear surface 162 (FIG. 5) that fits flushly against the front surface 152 so as to maximize heat transfer surface area and rate from the motor housing 76 to the rear cover 88. The front cover 86 has a large rear surface 166 (FIG. 6) which fits flushly against a large front surface 168 of the rear cover, the front surface 168 substantially correspondingly shaped and coextensive with the rear surface 162 of the rear cover 88, to maximize heat transfer surface area and rate between the rear cover 88 and a front cover 86.

The front cover includes laterally and longitudinally extending, heat-dissipating plate fins 172 to enhance heat transfer from the motor housing 76 via the rear cover 88 and the front cover 86.

Figure 6:
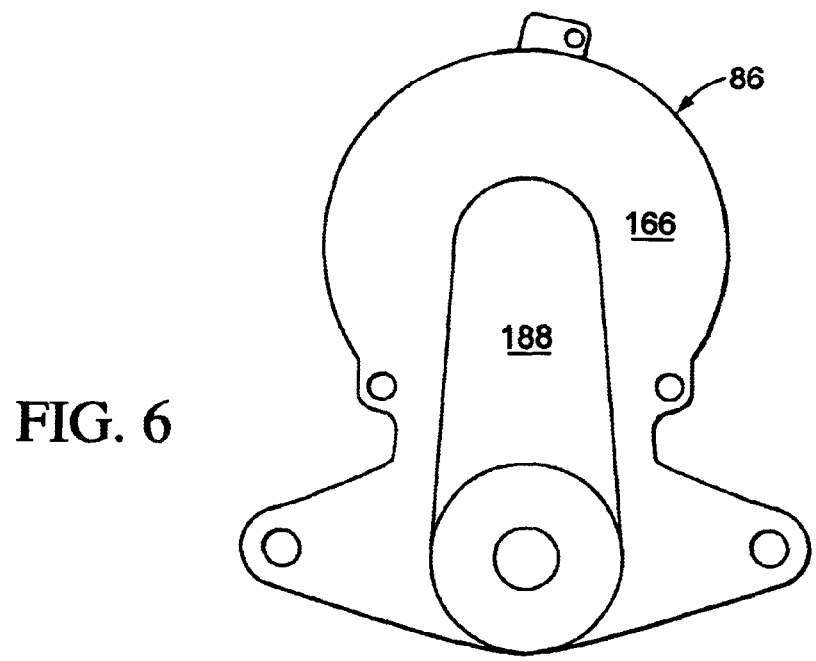
FIG. 6 is an elevational view of an inside surface of a front cover of a casing taken from the assembly of FIG. 2.

FIG. 6 illustrates the inside surface of the front cover 86. In a region of the motor attachment, the large, horseshoe-shaped flat surface 166 is pressed against the corresponding surface 168 of the rear cover 88. The front cover 86 includes a concave portion 188 which provides a volume within the casing 80 for the operation of the pulleys 110, 128 and the belt 132.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A brush-less permanent magnet electric motor drive for a reel of a reel mower, comprising:
    a brush-less permanent magnet electric motor having a rotor, a stator, and a motor housing that carries said rotor and stator, said rotor having a rotor output shaft extending from said housing;
    a casing mounted to said motor housing;
    an endless traction member engaged to said rotor output shaft to be circulated by rotation of said rotor output shaft;
    a secondary output shaft engaged by said endless traction member to be rotated by circulation of said endless traction member, said secondary output shaft extending from inside said casing to outside said casing to be operatively connected to said reel to rotate said reel;
    said motor and casing configured to be mounted on an outside of said reel.

2. A brush-less permanent magnet electric motor drive arrangement for a reel mower, comprising:
    a reel frame having side plates at opposite ends thereof;
    a reel having an axis of rotation, and mounted for rotation at opposite ends thereof to said side plates;
    a brush-less permanent magnet electric motor having a rotor, a stator, and a motor housing that carries said rotor and stator, said rotor having a rotor output shaft extending from said housing;
    a casing mounted to said motor housing;
    an endless traction member engaged to said rotor output shaft to be circulated by rotation of said rotor output shaft;
    a secondary output shaft engaged by said endless traction member to be rotated by circulation of said endless traction member, said secondary output shaft extending from inside said casing to outside said casing to be operatively connected to said reel to rotate said reel; and
    wherein said motor housing and said casing both include heat-dissipating fins.

3. The drive according to claim 2, wherein said motor housing comprises radially and axially extending, heat-dissipating plate fins and said casing comprises horizontal, axially extending heat-dissipating plate fins.

4. The drive according to claim 1, wherein said casing comprises laterally extending flanges, said flanges sized and arranged to receive a fastener on each side of the secondary output shaft to fasten said casing to a reel mower frame.

5. A brush-less permanent magnet electric motor drive arrangement for a reel mower, comprising:
    a reel frame having side plates at opposite ends thereof;
    a reel having an axis of rotation, and mounted for rotation at opposite ends thereof to said side plates;
    a brush-less permanent magnet electric motor having a rotor, a stator, and a motor housing that carries said rotor and stator, said rotor having a rotor output shaft extending from said housing;
    a casing mounted to said motor housing;
    an endless traction member engaged to said rotor output shaft to be circulated by rotation of said rotor output shaft;
    a secondary output shaft engaged by said endless traction member to be rotated by circulation of said endless traction member, said secondary output shaft extending from inside said casing to outside said casing to be operatively connected to said reel to rotate said reel; and
    wherein said casing comprises a front cover and a rear cover, said front cover comprises heat fins and said rear cover comprises a bearing for said secondary output shaft, said front and rear covers fastened to each other and to said motor housing.

6. The drive according to claim 5, wherein said front cover comprises a front bearing for said secondary output shaft.

7. A reel mower, comprising:
    a reel having a plurality of blades arranged around a lateral axis:
    a frame having side members which support said reel and allow rotation of said reel about said lateral axis;
    an electric motor having a rotor, a stator, and a motor housing that carries said rotor and stator, said rotor having a rotor output shaft extending from said motor housing;
    a casing mounted to said frame and connected to said motor housing;
    an endless traction member engaged to said rotor output shaft to be circulated by rotation of said rotor output shaft;
    a secondary output shaft engaged by said endless traction member to be rotated by circulation of said endless traction member, said secondary output shaft extending from inside said casing to outside said casing to be operatively connected to an end of said reel to rotate said reel; and
    said motor and casing configured to be carried by said frame on an outside of said reel.

8. The reel mower according to claim 7, wherein one of said casing or said frame comprises an open ended slot, and said casing is mounted to said frame by at least one threaded member engaged into said open ended slot, wherein loosening of said threaded member permits withdrawal of said threaded member from said slot in a direction substantially perpendicular to an axial direction of said threaded member.

9. The reel mower according to claim 7, wherein said casing is arranged to support said rotor output shaft vertically above said secondary output shaft, an axis of said rotor located above said lateral axis of said reel.

10. A reel mower, comprising:
    a reel having a plurality of blades arranged around a lateral axis:
    a frame having side members which support said reel and allow rotation of reel about said lateral axis;
    an electric motor having a rotor, a stator, and a motor housing that carries said rotor and stator, said rotor having a rotor output shaft extending from said motor housing;
    a casing mounted to said frame and connected to said motor housing;

an endless traction member engaged to said rotor output shaft to be circulated by rotation of said rotor output shaft;

a secondary output shaft engaged by said endless traction member to be rotated by circulation of said endless traction member, said secondary output shaft extending from inside said casing to outside said casing to be operatively connected to an end of said reel to rotate said reel; and wherein said motor housing and said casing both include heat-dissipating fins.

11. The reel mower according to claim 7, wherein said electric motor comprises a brush-less, permanent magnet motor.

12. The reel mower according to claim 7, wherein said casing is mounted to said frame by two threaded studs, each stud engaged on one end to said casing and on an opposite end by a head or nut, said frame including open ended slots corresponding in position to said studs, wherein said studs can be positioned into said slots by a positioning of said studs adjacent said corresponding slots and then a turning of said casing about an axis of said reel to slide said studs laterally into said slots, and thereafter said heads or said nuts can be tightened against said frame on a side of said frame opposite said casing to secure said casing to said frame.

13. The reel mower according to claim 10, wherein said motor housing comprises radially and axially extending, heat-dissipating plate fins and said casing comprises horizontal, axially extending heat-dissipating plate fins.

14. An electric motor drive arrangement for a reel mower, comprising a reel having an axis and a reel frame that rotationally carries said reel to rotate about said axis;

an electric motor having a rotor, a stator, and a motor housing that carries said rotor and stator, said rotor having a rotor output shaft extending from said housing;

a casing mounted to said motor housing;

an endless traction member engaged to said rotor output shaft to be circulated by rotation of said rotor output shaft;

a secondary output shaft engaged by said endless traction member to be rotated by circulation of said endless traction member, said secondary output shaft extending from inside said casing to outside said casing to be operatively connected to a reel of the reel mower to rotate said reel, said motor carried on said frame above said axis of said reel and outside said reel.

15. An electric motor drive, comprising an electric motor having a rotor, a stator, and a motor housing that carries said rotor and stator, said rotor having a rotor output shaft extending from said housing;

a casing mounted to said motor housing;

an endless traction member engaged to said rotor output shaft to be circulated by rotation of said rotor output shaft;

a secondary output shaft engaged by said endless traction member to be rotated by circulation of said endless traction member, said secondary output shaft extending from inside said casing to outside said casing to be operatively connected to an external device to rotate said external device; and wherein said motor housing and said casing both include heat-dissipating fins.

16. The drive according to claim 15, wherein said motor housing comprises radially and axially extending, heat-dissipating plate fins and said casing comprises horizontal, axially extending heat-dissipating plate fins.

17. The drive according to claim 14, wherein said reel frame comprises a reel housing and said casing comprises laterally extending flanges, said flanges sized and arranged to receive a fastener on each side of the secondary output shaft to fasten said casing to said reel housing.

18. An electric motor drive, comprising an electric motor having a rotor, a stator, and a motor housing that carries said rotor and stator, said rotor having a motor output shaft extending from said housing;

a casing mounted to said motor housing;

an endless traction member engaged to said rotor output shaft to be circulated by rotation of said rotor output shaft;

a secondary output shaft engaged by said endless traction member to be rotated by circulation of said endless traction member, said secondary output shaft extending from inside said casing to outside said casing to be operatively connected to an external device to rotate said external device;

wherein said casing comprises a front cover and a rear cover, said front cover comprises heat fins and said rear cover comprises a bearing for said secondary output shaft, said front and rear covers fastened to each other and to said motor housing.

19. The drive according to claim 18, wherein said front cover comprises a front bearing for said secondary output shaft.

20. The drive according to claim 14, wherein said endless traction member comprises a belt.

21. The drive according to claim 1, wherein said motor housing and said casing both include heat-dissipating fins.

22. The drive according to claim 1, wherein said motor housing comprises radially and axially extending, heat-dissipating plate fins and said casing comprises horizontal, axially extending heat-dissipating plate fins.

23. The drive according to claim 1, wherein said casing comprises a front cover and a rear cover, said front cover comprises heat fins and said rear cover comprises a bearing for said secondary output shaft, said front and rear covers fastened to each other and to said motor housing.

24. The drive according to claim 23, wherein said front cover comprises a front bearing for said secondary output shaft.

25. The reel mower according to claim 7, wherein said frame comprises two side plates and two reel housings, each reel housing fastened to one side plate, said reel housings configured to journal rotation of said reel, wherein said casing is fastened to one of said reel housings.

26. The reel mower according to claim 25, wherein one of said casing or said reel housing comprises an open ended slot, and said casing is mounted to said one reel housing by at least one threaded member engaged into said open ended slot, wherein loosening of said threaded member permits withdrawal of said threaded member from said slot in a direction substantially perpendicular to an axial direction of said threaded member.

* * * * *

UNITED STATES PATENT AND TRADEMARK OFFICE
CERTIFICATE OF CORRECTION

PATENT NO. : 6,946,762 B2
APPLICATION NO. : 10/651016
DATED : September 20, 2005
INVENTOR(S) : Brent Gordon Rinholm et al.

It is certified that error appears in the above-identified patent and that said Letters Patent is hereby corrected as shown below:

At column 6, line 60, change "rotation of reel about" to --rotation of said reel about--.

At column 8, line 15, change "motor" to --rotor--.

Signed and Sealed this

Twenty-sixth Day of September, 2006

JON W. DUDAS
*Director of the United States Patent and Trademark Office*